United States Patent
Goodman

[19]
[11] Patent Number: 5,884,749
[45] Date of Patent: Mar. 23, 1999

[54] CONVEYOR SYSTEM THAT RECEIVES ARTICLES AT A CONSTANT RATE AND BATCH DISCHARGES

[75] Inventor: James A. Goodman, Glencoe, Ill.

[73] Assignee: Prototype Equipment Corporation, Lake Forest, Ill.

[21] Appl. No.: 708,835

[22] Filed: Sep. 9, 1996

[51] Int. Cl.⁶ ............... B65G 47/29; B65G 47/00; B65G 47/38
[52] U.S. Cl. ............... 198/419.3; 198/418; 198/419.2; 198/813
[58] Field of Search ............... 198/419.2, 419.3, 198/813

[56] References Cited

U.S. PATENT DOCUMENTS

| | | | |
|---|---|---|---|
| 3,402,803 | 9/1968 | Griner | 198/419.2 |
| 3,902,587 | 9/1975 | Checcucci | 198/419.3 |
| 3,997,048 | 12/1976 | Hardy | 198/419.2 |
| 4,180,154 | 12/1979 | Andersson | 198/419.3 |
| 4,768,642 | 9/1988 | Hunter | 198/419.3 |
| 5,012,916 | 5/1991 | Cruver | 198/419.2 |
| 5,127,209 | 7/1992 | Hunter | 198/419.3 |
| 5,458,051 | 10/1995 | Alden et al. | 198/813 |
| 5,540,036 | 7/1996 | Scroggin et al. | 198/419.2 |

*Primary Examiner*—William E. Terrell
*Assistant Examiner*—Joe Dillon, Jr.
*Attorney, Agent, or Firm*—Brinks Hofer Gilson & Lione

[57] ABSTRACT

A conveyor system that includes a first set of rive belts having a first set of flights that can receive individual products at a given rate per product and quickly advance several individual package positions when the first set of flights are full to a discharge position. The first set of flights can pause for a discharge period that can be longer than individual products reception rate. During the pause period a second set of drive belts locates a second set of flights such that the next product that is delivered to the conveyor system, without interrupting the continuous flow is received by the second set of flights.

14 Claims, 4 Drawing Sheets

5,884,749

CONVEYOR SYSTEM THAT RECEIVES ARTICLES AT A CONSTANT RATE AND BATCH DISCHARGES

BACKGROUND OF THE INVENTION

This invention relates to a conveyor system that can receive products at a continuous rate and discharges groups of products without stopping or interfering with the reception of products. Individual products can be deposited on the surface of a conveyor system at extremely fast rates. When individual products are being deposited at relatively slow rates it may be possible to remove groups of products at the same rate however as the rate of depositing individual products increases it becomes impossible to remove groups of products at the same rate. When this occurs either the rate of depositing individual products must be decreased or the conveyor system must be stopped to allow the group to be removed. This is particularly true when the individual products are deposited on the conveyor in a systematic order and it is desired to maintain this order in the group after it is removed.

As an example, when bags of a snack food are fed from a form, fill and seal machine to a conveyor system they can be continuously deposited on the conveyor receiving surface in a systematic order. If it is desired to place these bags into a carton it would be advantageous to pick up the bags of snack food in groups that would fill a row in the carton. However, if it requires twelve bags to fill a row in the carton and the bags of snack food are being deposited on the conveyor system at a rate of one bag per second and it require three seconds to remove the group of twelve bags while maintaining the systematic order that they were deposited in, then the system cannot be operated continuously. If the conveyor system is stopped for three seconds to enable the group of twelve to be properly removed, then it will be necessary to either divert two packages or stop the form, fill and seal machine. Neither solution is acceptable.

For the foregoing reasons, there is a need for a conveyor system that can receive products at a continuous rate and will permit a groups of products to be held for a period of time in excess of the per unit reception rate without stopping or interfering with the continuous reception rate of products.

SUMMARY OF THE INVENTION

For the foregoing reasons there is a need for a conveyor system that can receive individual products at a given rate per product and discharge groups of products at a rate that exceeds the individual products reception rate.

The present invention has the advantage that product can be fed to a conveyor system at a fixed rate while removing groups of products from the conveyor system with devices and using methods that require the group of products to be removed to be stopped for a period of time that exceeds the per unit reception rate.

The present invention is directed to a conveyor system that receives products at a continuous rate and permits groups of products to be stopped for periods that exceed the reception time for an individual product without stopping or interfering with the continuous reception of products on the conveyor system.

The apparatus consist of a continuous conveyor having a longitudinal product receiving surface, a set of flights that can be indexed along the receiving surface at a rate corresponding to the rate that products are being received and at a faster rate after the set of flights have been filled with product.

The apparatus further consist of an additional set of flights that can be indexed along the receiving surface at a rate corresponding to the rate that products are being received and at a faster rate after its set of flights have been filled with product.

Further, the apparatus consist of mechanism that will make the other set of flights available to receive the individual package that follows the last package that is fed to the previous set of flights.

This invention also consist of the method of continuously feeding products to a conveyor system at a fixed rate per product and removing groups of products from the conveyor system by a process that requires more time than the individual package reception rate.

DETAILED DESCRIPTION OF THE PREFERRED EMBODIMENT

Figure 1:
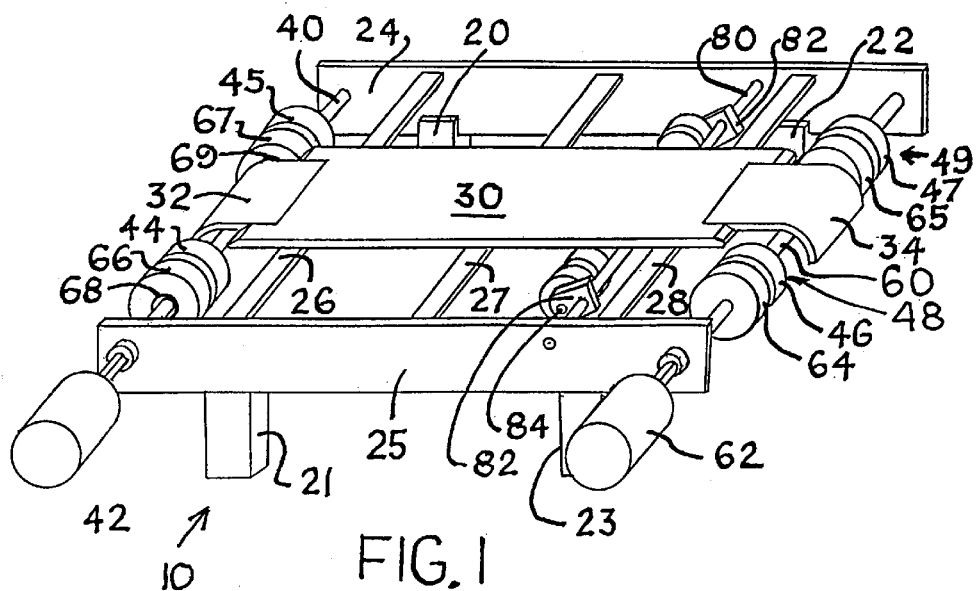
FIG. 1 is perspective view of a version of the conveyor mechanism in which the belts are not shown in order to better show the components of the mechanism that are below the belts.
Figure 2:
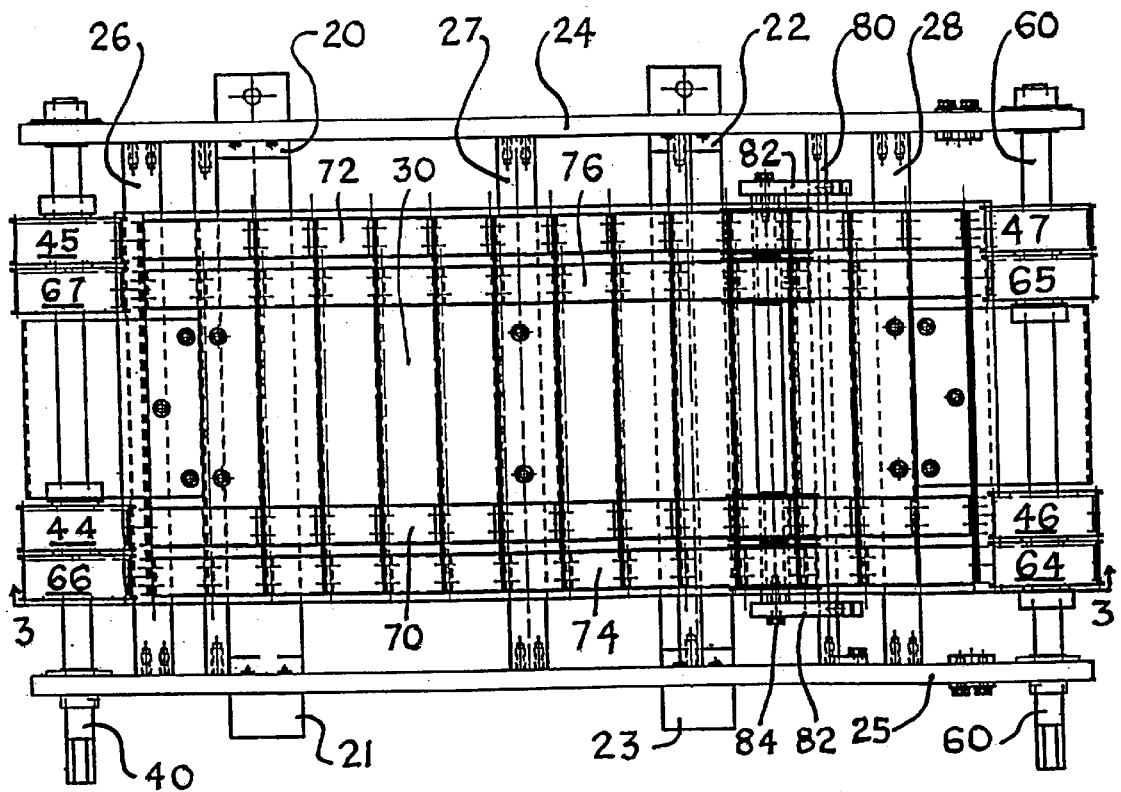
FIG. 2 is a plan view of the conveyor mechanism.

An embodiment of a conveyor system 10 of this invention is illustrated in FIGS. 1 through 6. It should be noted that in FIG. 1, the timing belts and flights are not shown, in order to better illustrate the components that would be hidden by the elements not shown. Although the structure of the conveyor system 10 that is illustrated in FIGS. 1–6, represented the best mode of the invention at the time this application was filed, conveyor systems of other sizes and shapes are contemplated.

The conveyor system 10, that is illustrated in FIGS. 1 through 6, includes a frame comprising legs 20, 21, 22 and 23 and longitudinal members 24 and 25 that are connected by cross members 26, 27 and 28. A conveyor bed or receiving surface 30 is fixed to the cross members 26, 27 and 28. Arcuate extensions 32 and 34 of the receiving surface 30 are provided at each end thereof.

A forward drive shaft 40 is journaled at one end of the longitudinal members 24 and 25 and rear drive shaft 60 is journaled at the other end of the longitudinal members 24 and 25. Servo motors 42 and 62 are connected to and drives shafts 40 and 60 respectfully.

A set of drive pulleys 44 and 45 are mounted on shaft 40 to rotate therewith. A set of bearings 68 and 69 are carried by the shaft 40 upon which are mounted a pair of pulleys 66 and 67. The pulleys 66 and 67 can freely rotate with respect to shaft 40.

A set of drive pulleys 64 and 65 are mounted on shaft 60 to rotate therewith. Drive pulleys 64 and 65 are aligned with the freely rotating pulleys 66 and 67 carried by shaft 40. A first timing belt 70 runs on pulleys 44 and 46 and a second timing belt 72 runs on pulleys 45 and 47. A set of bearings 48 and 49 are carried by the shaft 60 upon which are mounted a pair of pulleys 46 and 47. The pulleys 46 and 47 can freely rotate with respect to shaft 60. Freely rotating pulleys 46 and 47 are aligned with pulleys 44 and 45 that are fixed to shaft 40. A third timing belt 74 runs on pulleys 64 and 66 and a fourth timing belt 76 runs on pulleys 65 and 67.

The servo motors 42 and 62 are controlled by a microprocessor (not shown) such that they can cause shafts 40 and 60 to rotate a specific amount at a specific speed at predetermined times in the conveyor cycle. The microprocessor can be programmed to control the amount of rotation, the speed of rotation and pause periods between indexing of the shafts.

A tension shaft 80 is journaled in longitudinal members 24 and 25. A pair or arms 82 are secured to tension shaft 80 and a rod 84 is carried by the free ends of arms 82. Four tension pulleys 86 are carried by the rod 84 such that they rest on the timing belts 70, 72, 74 and 76 for the purpose of applying pressure thereto and taking up any slack in the belts.

A first set of flights 91–103, extend across the receiving surface 30 and are secured to the timing belts 70 and 72 such that this set of flights is driven by drive shaft 40 which in turn is driven by servo motor 42.

A second set of flights 111–123, extend across the receiving surface 30 and are secured to the timing belts 74 and 76 such that this set of flights is driven by drive shaft 60 which in turn is driven by servo motor 62.

A single cycle of the operation of the invention will be discussed with reference to FIGS. 7 through 12. In this example of a cycle of the operation of the invention, the conveyor system is being used to process bags of snack food such as potato chips. A group of twelve bags of potato chips are collected on the conveyor receiving surface 30, the completed group of bags is quickly advanced to a discharge station which is several package positions beyond a single package position advance. The set of flights holding the first group of packages, pauses at the discharge station while the packages are discharged. Discharge of the packages can take longer than the cycle time allotted for depositing the first package of the next or second group. However, since the flights for the first group have been quickly advanced several packages positions the first group flights are free to pause for a period in excess of the single package delivery time.

Figure 3:
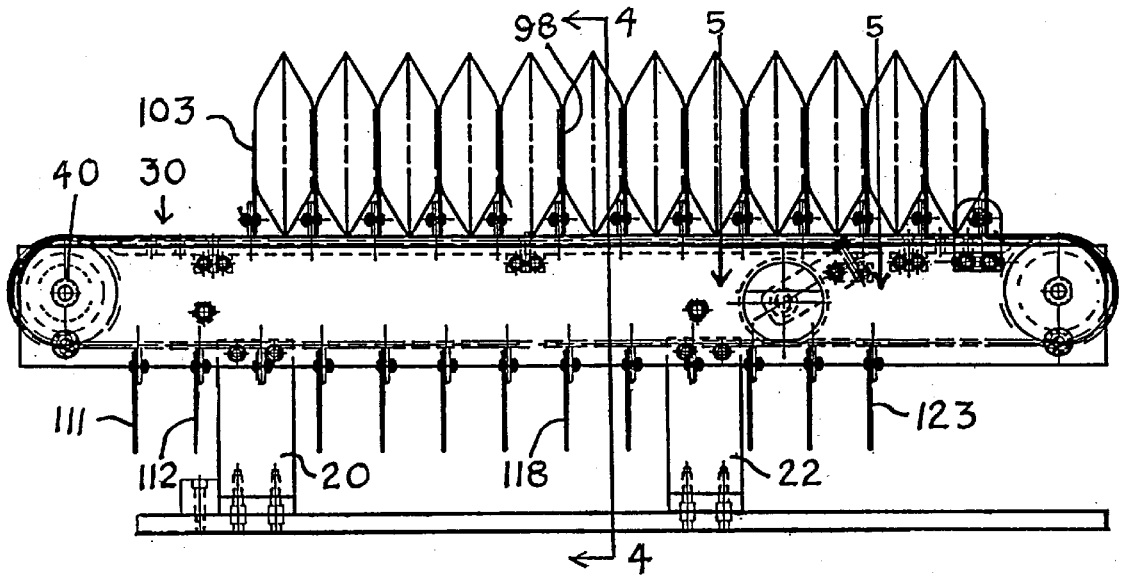
FIG. 3 is a side cross-section view of the conveyor mechanism, including a group of packages contained in the upper rung of the conveyor mechanism, taken along lines 3—3 of FIG. 2.
Figure 4:
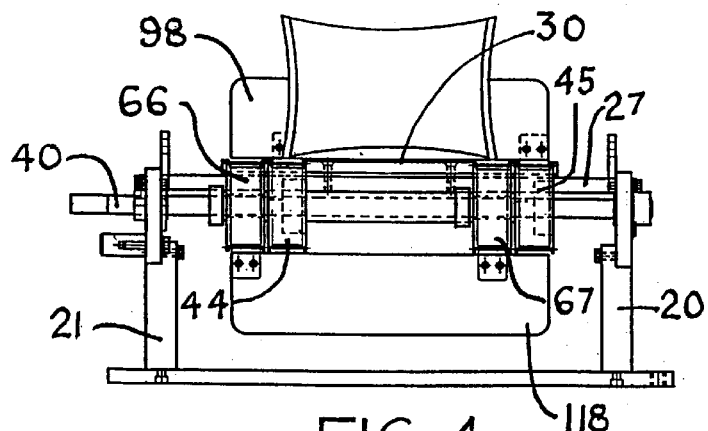
FIG. 4 is a cross-section view of the conveyor mechanism, taken along lines 4—4 of FIG. 3.
Figure 5:
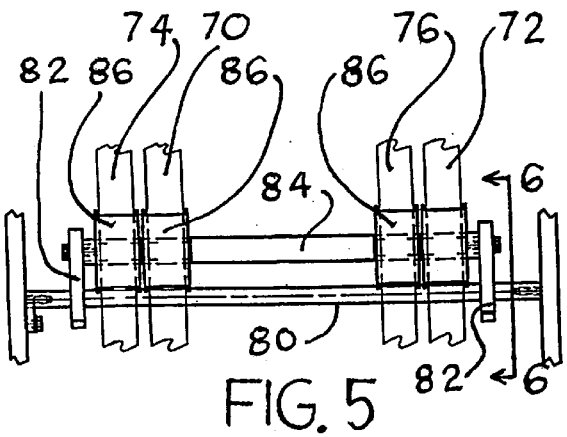
FIG. 5 is a cross-section view of the take-up mechanism, taken along lines 5—5 of FIG. 3.
Figure 6:
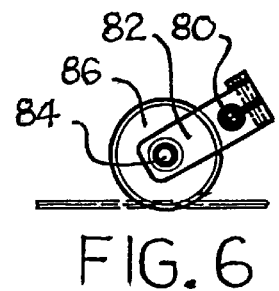
FIG. 6 is a cross-section view of the take-up mechanism, taken along lines 6—6 of FIG. 5.
Figure 7:
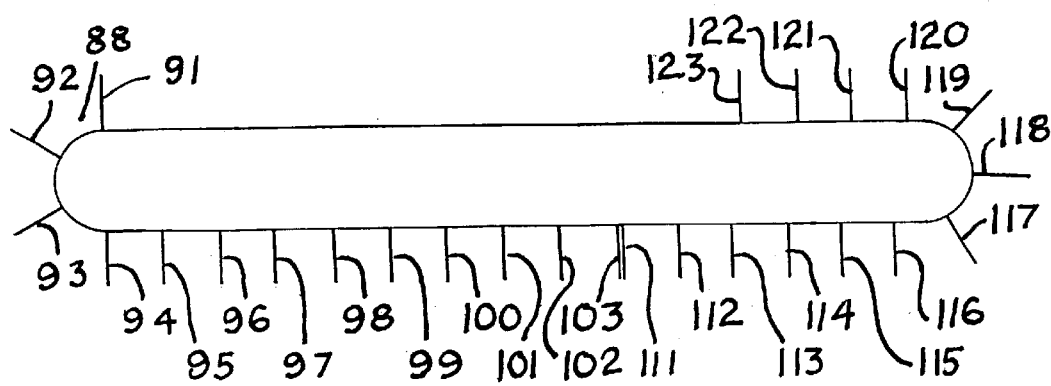
FIG. 7 is a stylized side view of the conveyor mechanism at the point in the cycle before the first package has been deposited.

In FIG. 7, the flights 91 and 92 are located such that they define the package delivery station 88. Packages are always delivered at this station 88 and the flights 91–103 and 111–123 continuously move away from and back to delivery station 88. In should be noted that in FIG. 7, the first flight 111 of the second set of flights is flush against the last flight 103 of the first set. However, it is not necessary that this always be so. For example, as illustrated in FIG. 3, the first flight 111 of the second set is several package lengths behind the last flight 103 of the first set. In the embodiment shown in FIG. 3, the first 111 and second 112 flights of the second set must advance to the position of flights 91 and 92 in FIG. 7 before the next package is delivered. Servo motor 62 receives the appropriate signal from the microprocessor at the appropriate time in the cycle which results in flights 111 and 112 being quickly indexed forward at the proper time.

In the example illustrated in FIGS. 7 through 12, an arbitrary period of one second has allotted for the flights to advance one package position and for a package to be deposited between the set of flights. A period less than or greater than one second could of course be utilized. As is conventional the microprocessor could be equipped with a touch screen that would permit a machine operator to program the system through the touch screen. Each of these one second intervals is comprised of a travel component and a package delivery component. In this example if one-half second is required to advance the flights to the delivery station than there is a one-half second dwell period for the package to be deposited on the receiving surface between the flights. At this rate the conveyor system 10 could process 60 packages per minute. This delivery rate is used for the purpose of a simple example and is not representative of actual delivery rates for the actual conveyor system of this invention. The conveyor system of this invention can operate at much greater rates than this example. The invention has been successfully run at a rate of 120 packages per minute and it is contemplated that speeds in excess of 120 packages can be attained.

Figure 8:
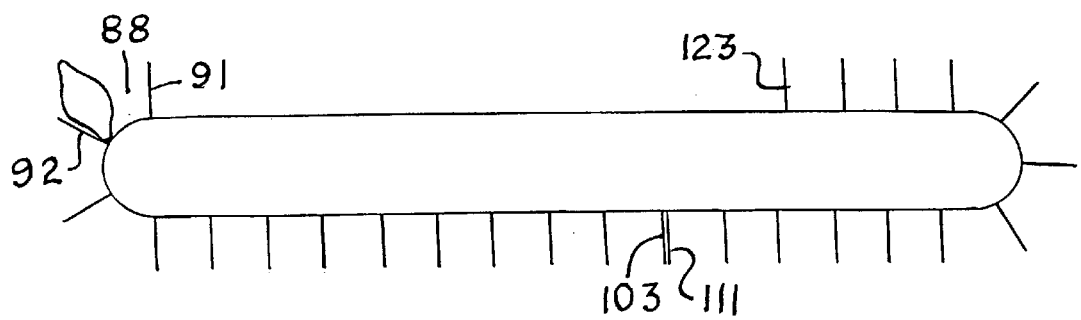
FIG. 8 is a stylized side view of the conveyor mechanism at the point in the cycle at which the first package of the first group has been deposited.

FIG. 7 should be considered to be at time 00:00:05 and FIG. 8 is at time 00:00:01. In other words in FIG. 7 the travel component of the first one second interval has been completed and in FIG. 8 the package delivery component of the first one second interval has been completed. At one second into the cycle, as seen in FIG. 8, the first package of the first group has been deposited on the receiving surface between flights 91 and 92.

Figure 9:
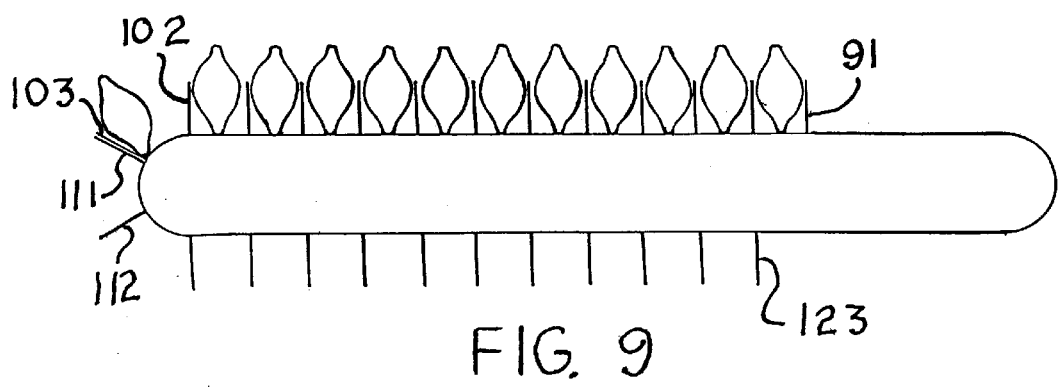
FIG. 9 is a stylized side view of the conveyor mechanism at the point in the cycle at which all packages of the first group have been deposited.

FIG. 9 is at time 00:00:12 or twelve seconds into the cycle. At this point in the cycle all twelve packages that comprise the first group have been deposited on the receiving surface between flights 91 and 103. It should be noted that at this time in the cycle flight 111, the first flight of the second group of flights remains flush against flight 103.

Figure 10:
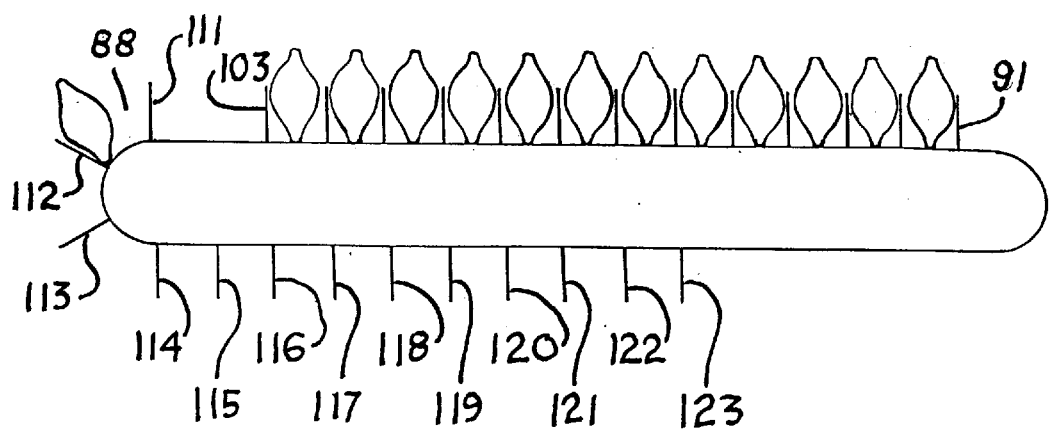
FIG. 10 is a stylized side view of the conveyor mechanism at the point in the cycle at which the first group has been advanced to the discharge position and the first package of the second group has been deposited.

FIG. 10 is at time 00:00:13 or one second after the illustration of FIG. 9. However, in this one second flight 103 has advance three package lengths while flight 111 has advance a single package length. This is possible because the flights 91 through 103 for the first group are driven by servo motor 42 and the flights 111 through 123 are driven by servo motor 62. Each servo motor 42 and 62 receives signals from the system micro processor to advance a specific number of package positions, depending upon the time in the sequence, when a package about to be deposited is recognized.

Figure 11:
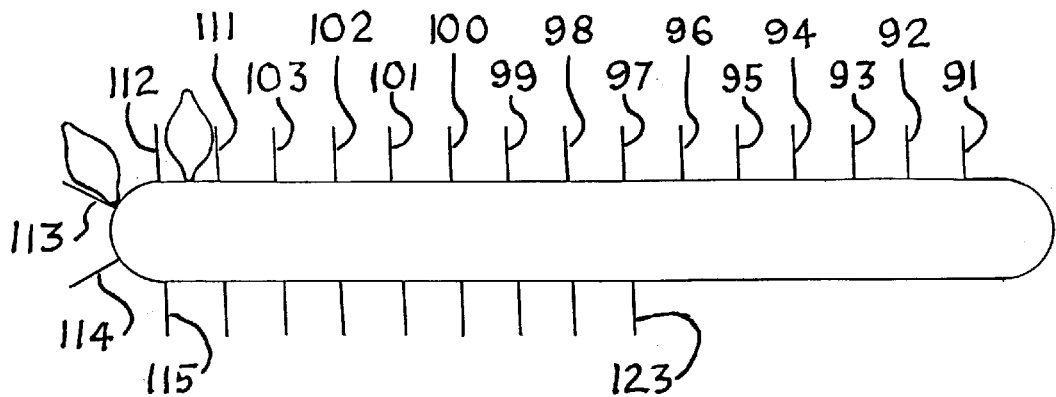
FIG. 11 is a stylized side view of the conveyor mechanism at the point in the cycle at which the packages of the first group have been discharged although the first group flights remain at the discharge position and the first and second packages of the second group have been deposited.

FIG. 11 is at time 00:00:14 and a second package for the second group has been deposited between flights 112 and 113. The group one packages have been discharged from between the flights 91 through 103, however flights 91 through 103 have not moved from their FIG. 10 positions. Thus a full two seconds was available to discharge the packages from between the flights 91 through 103. Actually the half second package delivery component from the previous one second interval as well as the half second travel component from the next one second interval are also available for the discharge of the first group of packages.

Figure 12:
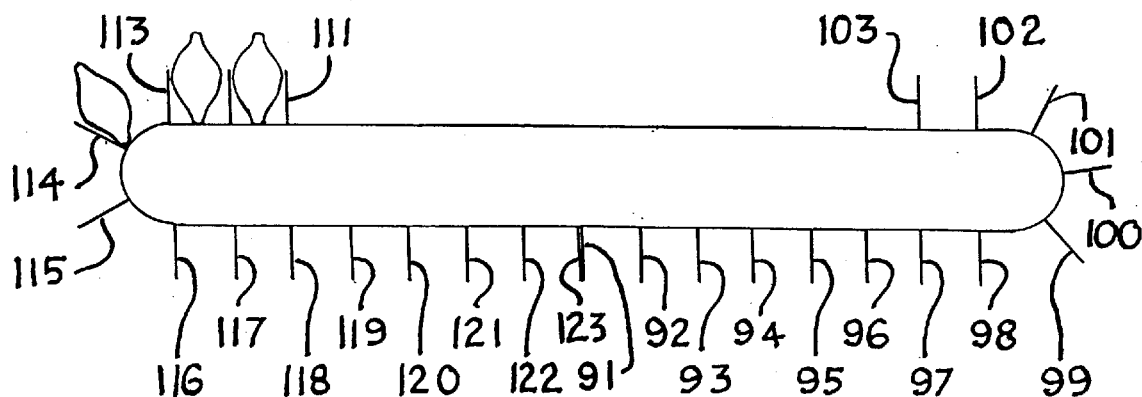
FIG. 12 is a stylized side view of the conveyor mechanism at the point in the cycle at which the first group flights have been advanced to a position following the last flight of the second group flights and three packages of the second group have been deposited.

FIG. 12 is at time 00:00:15 and a third package for the second group has been deposited between flights 113 and 114. At this time in the cycle the set of flights 91 through 103 have been quickly advanced to the point at which the first flight 91 of the first group is now flush with the last flight 123 of the second group.

At time 00:00:24 the sequence is again at the point similar to that shown in FIG. 9, differing only in that now flights 111 through 123, rather than flights 91 through 103, have a complete group of packages between them. At time 00:00:25 the sequence is similar to that shown in FIG. 10 with the first packages of the first group between flights 91 and 92 and the complete set of flights 111 through 123 having advanced three package positions where they will pause to be emptied.

While the invention has heretofore been described in detail with particular reference to illustrated apparatus, it is to be understood that variations, modifications and the use of equivalent mechanisms can be effected without departing from the scope of this invention. It is, therefore, intended that such changes and modifications be covered by the following claims.

It is intended that the accompanying Drawings and foregoing detailed description is to be considered in all respects as illustrative and not restrictive, the scope of the invention is intended to embrace any equivalents, alternatives, and/or modifications of elements that fall within the spirit and scope of the invention, and all changes which come within the meaning and range of equivalency of the claims are therefore intended to be embraced therein.

What is claimed is:

1. In a device for receiving a flow of containers that are being fed at a continuous rate of one container per unit of time and discharging groups of the containers, said groups being of a predetermined number and are stopped as a group for discharge during a discharge periods that exceeds said per unit of time comprising:

a longitudinally extending conveyor bed having a receiving surface extending along its length;

said longitudinally extending conveyor bed and said receiving surface having corresponding first ends and second ends;

a first drive shaft journaled in said first end of said longitudinally extending conveyor bed;

a second drive shaft journaled in said second end of said longitudinally extending conveyor bed;

a first set of drive sprockets secured to said first drive shaft, said first set of drive sprockets being spaced from each other along said first drive shaft;

a second set of drive sprockets secured to said second drive shaft, said second set of drive sprockets being spaced from each other along said second drive shaft;

a first set of idler sprockets mounted to rotate on and relative to said first drive shaft, said first set of idler sprockets being mounted for rotation on said first drive shaft at spaced locations such that they are aligned with said second set of drive sprockets that are secured to said second drive shaft;

a second set of idler sprockets mounted to rotate on and relative to said second drive shaft, said second set of idler sprockets being mounted for rotation on said second drive shaft at spaced locations such that they are aligned with said first set of drive sprockets that are secured to said first drive shaft;

a drive mechanism connected to said first drive shaft that is programmed to [can ]index said first drive shaft a predetermined amount following the reception of all but the last of said predetermined number of containers and an amount in excess of said predetermined amount following the reception of the last of said predetermined number of containers, a drive mechanism connected to said second drive shaft that is programmed to index said second drive shaft a predetermined amount following the reception of all but the last of said predetermined number of containers and an amount in excess of said predetermined amount following the reception of the last of said predetermined number of containers;

a first pair of drive belts, overlaying said longitudinally extending conveyor bed, and extending over said first set of drive sprockets and said first set of idler sprockets and are driven thereby; and a second pair of drive belts, overlaying said longitudinally extending conveyor bed, and extending over said second set of drive sprockets and said second set of idler sprockets and are driven thereby.

2. The invention as set forth in claim 1, wherein a second set of flights are connected to said second pair of drive belts.

3. The invention as set forth in claim 1 wherein a pair of tension pulleys engage said second pair of drive belts and function to maintain said second pair of drive belts taught and take up slack therein.

4. The invention as set forth in claim 1 wherein a pair of tension pulleys engage said first pair of drive belts and function to maintain said first pair of drive belts taught and take up slack therein.

5. The invention as set forth in claim 4 wherein a pair of tension pulleys engage said second pair of drive belts and function to maintain said second pair of drive belts taught and take up slack therein.

6. The invention as set forth in claim 1, wherein a first set of flights are connected to said first pair of drive belts.

7. The invention as set forth in claim 5, wherein a second set of flights are connected to said second pair of drive belts.

8. The invention as set forth in claim 7, wherein said first and second sets of flights extend substantially perpendicular to said receiving surface while traversing along its length.

9. A conveyor for receiving the flow of individual packages, one after the other as a group, said packages are fed to the conveyor at a fixed rate of one package per given unit of time, when a complete groups of packages is collected the group is quickly indexed forward to a load position, while the formation of another group is started, the first package of the new group being fed to the conveyor in the unit of time following the unit of time that the last package from the previous group was fed to the conveyor, the first group of packages that were indexed forward to a load position dwelling at said load position for a sufficient time to discharge the group of packages from the conveyor and when the packages are discharged this group of flights are caused to move forward to a position behind the other group of flights from which it can indexes forward with the group that is receiving packages comprising:

a longitudinally extending conveyor bed having a receiving surface extending along its length;

said longitudinally extending conveyor bed and receiving surface having corresponding first ends and second ends;

a first drive shaft journaled in said first end of said longitudinally extending conveyor bed;

a second drive shaft journaled in said second end of said longitudinally extending conveyor bed;

a first set of drive sprockets secured to said first drive shaft, said first set of drive sprockets being spaced from each other along said first drive shaft;

a second set of drive sprockets secured to said second drive shaft, said second set of drive sprockets being spaced from each other along said second drive shaft;

a first set of idler sprockets mounted to rotate on and relative to said first drive shaft, said first set of idler sprockets being mounted for rotation on said first drive shaft at spaced locations such that they are aligned with said second set of drive sprockets that are secured to said second drive shaft;

a second set of idler sprockets mounted to rotate on and relative to said second drive shaft, said second set of idler sprockets being mounted for rotation on said second drive shaft at spaced locations such that they are aligned with said first set of drive sprockets that are secured to said first drive shaft;

first drive belts, overlaying said longitudinally extending conveyor bed, and extending over said first set of drive sprockets and said first set of idler sprockets;

second drive belts, overlaying said longitudinally extending conveyor bed, and extending over said second set of drive sprockets and said second set of idler sprockets; and a servo drive connected to said first drive shaft that is programmed to index said first drive shaft forward in response to each package being delivered to the conveyor and also move the drive shaft forward at a rapid speed when the group is completed and again after the packages have been removed.

10. In a device for receiving a flow of packages that are being fed at a rate of one package per unit of time and discharging packages in groups that have been stopped for a periods that exceeds said per unit of time comprising:

a longitudinally extending conveyor bed having a receiving surface extending along its length;

said longitudinally extending conveyor bed and receiving surface having corresponding first ends and second ends;

a first drive shaft journaled in said first end of said longitudinally extending conveyor bed;

a second drive shaft journaled in said second end of said longitudinally extending conveyor bed;

a first set of drive sprockets secured to said first drive shaft, said first set of drive sprockets being spaced from each other along said first drive shaft;

a second set of drive sprockets secured to said second drive shaft, said second set of drive sprockets being spaced from each other along said second drive shaft;

a first set of idler sprockets mounted to rotate on and relative to said first drive shaft, said first set of idler sprockets being mounted for rotation on said first drive shaft at spaced locations such that they are aligned with said second set of drive sprockets that are secured to said second drive shaft;

a second set of idler sprockets mounted to rotate on and relative to said second drive shaft, said second set of idler sprockets being mounted for rotation on said second drive shaft at spaced locations such that they are aligned with said first set of drive sprockets that are secured to said first drive shaft;

first drive belts, overlaying said longitudinally extending conveyor bed, and extending over said first set of drive sprockets and said first set of idler sprockets;

second drive belts, overlaying said longitudinally extending conveyor bed, and extending over said second set of drive sprockets and said second set of idler sprockets; and a drive mechanism connected to said first drive shaft that is programmed to drive said first drive shaft at a predetermined rate for a predetermined period;

a drive mechanism connected to said second drive shaft that is programmed to drive said second drive shaft at a predetermined rate for a predetermined period.

11. A method for discharging a group of packages of a predetermined number from the receiving surface of a conveyor that receives individual packages from a discharge mechanism in a continuous stream of one package every predetermined time period comprising the steps of:

(1) discharging individual packages from said discharge mechanism, between a first set of flights that are spaced from each other a distance of one package position, onto said receiving surface;

(2) providing a first pair of drive belts, that functions as a receving surface, for indexing and advancing said first set of flights;

(3) indexing said first set of flights forward at least one package position following the discharge of each individual package;

(4) repeating steps (1) and (3) until a first group of packages has accumulated on said receiving surface;

(5) advancing said first set of flights a distance in excess of one package position and simultaneously advancing a second set of flights forward one package position in the same time period required to perform step 3;

(6) providing a second pair of drive belts, that functions as a receiving surface, for indexing and advancing said second set of flights (7) discharging individual packages from said discharge mechanism between said second set of flights, that are spaced from each other a distance of one package position, onto said receiving surface;

(8) indexing said second set of flights forward at least one package position following the discharge of each individual package;

(9) repeating steps (6) and (8) until a group of packages of said predetermined number has accumulated on said receiving surface between said second set of flights;

(10) discharging said first group of packages from said receiving surface;

(11) advancing said first set of flights to a position following said second set of flights from which position said first set flights are programmed to be indexed to receive the next package between its flights after the last package is discharged to said second set of flights.

12. The method as set forth in claim 11 wherein the following additional step is performed:

(12) applying pressure to said second pair of drive belts to maintain them taught.

13. The method as set forth in claim 11 wherein the following additional step is performed:

(12) applying pressure to said first pair of drive belts to maintain them taught.

14. The method as set forth in claim 13 wherein the following additional step is performed:

(13) applying pressure to said second pair of drive belts to maintain them taught.

* * * * *

UNITED STATES PATENT AND TRADEMARK OFFICE
CERTIFICATE OF CORRECTION

PATENT NO. : 5,884,749
DATED : March 23, 1999
INVENTOR(S) : James A. Goodman

It is certified that error appears in the above-identified patent and that said Letters Patent is hereby corrected as shown below:

Abstract, face, line 1, Change "rive" to -- drive --.

Claim 1, Column 5, line 44, Change "periods" to -- period --;
    Column 6, line 8, Delete "[can]".

Claim 9, Column 6, line 53, Change "groups" to -- group --;
    Column 6, line 64, Change "indexes" to -- index --.

Claim 10, Column 7, line 43, Change "periods" to -- period --.

Claim 11, Column 8, line 29, Change "receving" to -- receiving --.

Signed and Sealed this

Tenth Day of August, 1999

*Attest:*

Q. TODD DICKINSON

*Attesting Officer*      *Acting Commissioner of Patents and Trademarks*